United States Patent

Jauvtis

[15] 3,646,585

[45] Feb. 29, 1972

[54] MAGNETIC DOMAIN ADDER-SUBTRACTOR NETWORK

[72] Inventor: Harvey I. Jauvtis, Belmont, Mass.

[73] Assignee: The United States of America as represented by the Secretary of the Air Force

[22] Filed: Dec. 31, 1969

[21] Appl. No.: 889,373

[52] U.S. Cl. ................................340/174 MC, 340/174 ZB

[51] Int. Cl. ....................................G11c 11/14, G11c 19/00

[58] Field of Search ................340/174 TF, 174 ZB, 174 MC

[56] References Cited

UNITED STATES PATENTS 3,438,006 4/1969 Spain ............................340/174 MC

*Primary Examiner*—Bernard Konick
*Assistant Examiner*—Steven B. Pokotilow
*Attorney*—Harry A. Herbert, Jr. and Julian L. Siegel

[57] ABSTRACT

A combination adder and subtractor unit in two magnetic film layers in which magnetic domains representing binary bits are introduced and controlled through a series of magnetic domain diodes, fan-outs, and film-to-film transfers. Adjacent channels in different layers act as inhibit gates and in combination form exclusive OR gates.

4 Claims, 4 Drawing Figures

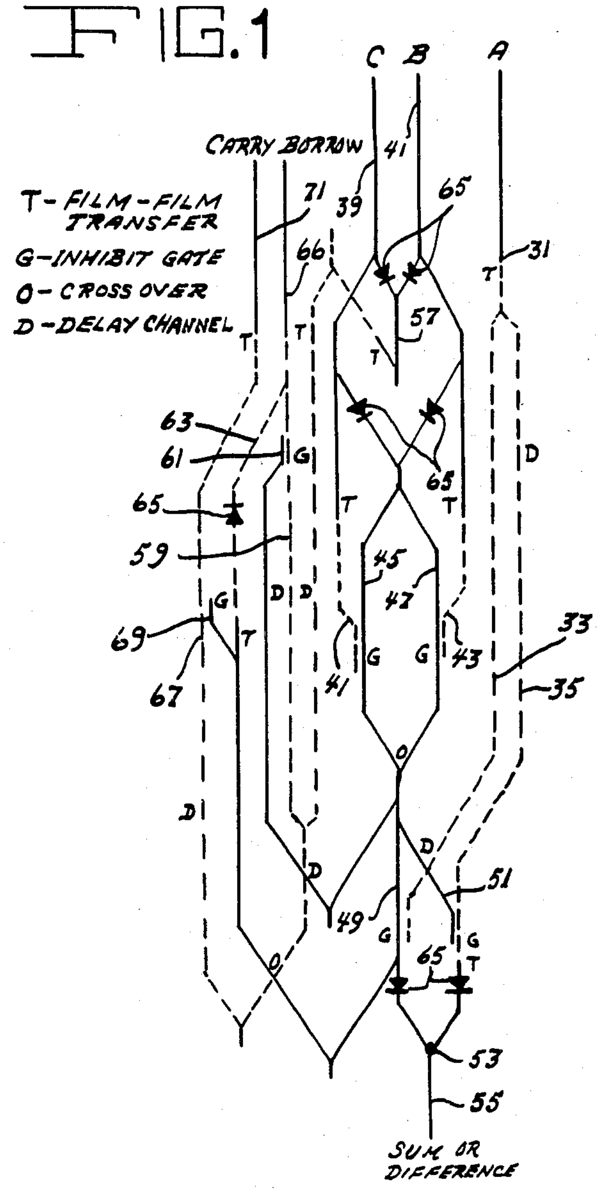
FIG. 2
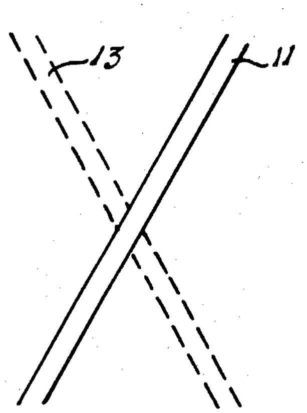
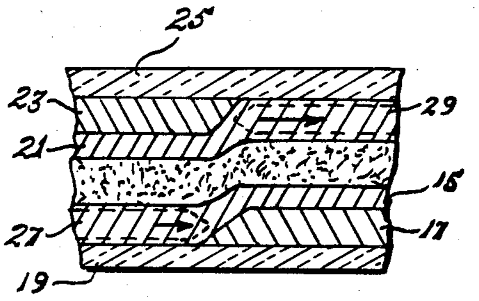
FIG. 3
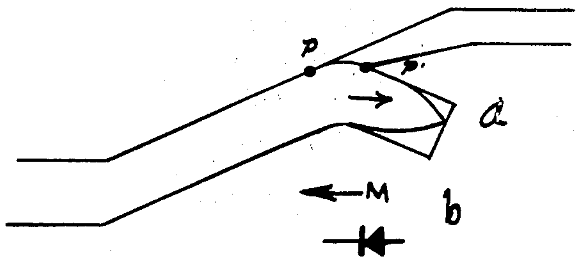
FIG. 4
INVENTOR.
HARVEY I. JAUVTIS
BY Harry A. Herbert Jr.
Julian L. Siegel
ATTORNEYS

MAGNETIC DOMAIN ADDER-SUBTRACTOR NETWORK

BACKGROUND OF THE INVENTION

This invention relates to magnetic domain circuits, and more particularly to a combination adder-subtractor network.

The technique, called domain tip propagation logic, makes use of the controlled growth of domains which are confined to a pattern of narrow, low coercive force channels embedded in a film element of generally high coercive force. Information is stored within regions of the low coercive force channels in the form of domains of reversed magnetization and propagated through the channels under the influence of an applied field by expansion of the domains at the domain tips In this manner it is possible to control the direction of domain tips propagation and the mutual interaction between domain tips within channels brought into proximity of each other. The dependence of the direction of domain tip propagation upon the magnitude and direction of the applied field, the magnetostatic forces between neighboring domain tips, and the speed of domain tip propagation are used in the present invention.

The term "domain tip propagation," is used to describe magnetization reversal which occurs by growth of a domain of reversed magnetization in the vicinity of the spikelike extremity of the domain as opposed to the sidewise expansion of the domain boundaries. The direction of domain tip propagation is sensitive to the direction of the applied field causing switching. Tip propagation can be directed to one side of the easy axis or to the other, depending upon the sense of the hard axis component of the drive field.

In addition, there are stray magnetic fields associated with the domain tips as a result of the nonzero divergence of the magnetization vector within the transition region separating opposing magnetizations. The source of the stray field surrounding a domain tip resembles a unipolar accumulation of "magnetic charge," the charge of opposite sign located at the opposite end of the long, narrow domain formed by the propagated tip. Domain tips which grow in the same easy axis direction have a net charge of the sign while the charge of tips growing in opposite easy axis directions are of opposite sign. The tendency is thus for domain tips propagated in the same direction to repel each other and for those propagated in opposite directions to attract each other.

From a study of domain tip propagation, a new technique for the performance of thin film, all-magnetic logic has emerged. The velocity of domain tip propagation has been observed to attain values as great as $10^6$ cm./sec. The speed and directionality of propagation and the stray field strength of domain tips is used in the present invention.

In order to provide a reliable control over the direction of tip propagation for the purpose of device fabrication, it is possible to build into the magnetic film element channels of low coercive force through which domain tips can travel. The magnetic material outside these channels is of high coercive force so that switching of the magnetization is restricted to within the low coercive force channels by the growth of domains of reversed magnetization at the domain tips. The high coercive force material external to the propagation channels, in addition to restricting flux reversal to a particular pattern of low coercive force paths, plays a most important role in providing continuity of magnetization at the channel edges and thus inhibiting the spontaneous nucleation of unwanted domains within the low coercive force channels.

The forces of interaction between domain tips are found to reach values equivalent to several oersteds, of the order of coercive force for the motion of domain tips restricted to narrow channels, so that it is possible to utilize such forces of attraction and repulsion for the purpose of performing logic operations within a magnetic film. The film is prepared such that low coercive channels are provided in a pattern appropriate to the logic functions desired.

The field from a channeled domain tip, in combination with the applied driving field, is used to cause nucleation of a new domain within a second low coercive force channel. The applied field and channel separation are chosen such that nucleation can occur only if the original domain tip is present. By providing two input channels a configuration can be chosen such that nucleation into a third channel occurs only when both input tips are present. The presence of one or none of the two input domain tips provides insufficient field for nucleation to take place. With the convention that the presence of a domain of reversed magnetization represents a bit of stored information (one) and using the channel demarcations, the channel pattern can perform the AND function, $C=AB$. Further, two such circuits can be combined and the outputs OR-ed. The logic function performed is then $E=AB+CD$.

SUMMARY OF THE INVENTION

An improved adder-subtractor network is presented here for use as a domain tip propagation network. Comparing the adder-subtractor network used in the past, the portion of the logic that generates the Borrow and Carry outputs is folded back into the inputs. This change is made possible by the fact that in the arithmetic unit, Borrow and Carry outputs are normally fed back to a storage register located in the input end and a 33 percent reduction in network length results. Another advantage is in the second exclusive OR configuration. In the prior art DTPL adder-subtractor network, the output of the second exclusive OR is OR-ed with one of the inputs such that the delay between these domain tips is critical and must be minimized. In the present invention the problem is obviated as this input is split into two channels, one low speed and one high speed, neither of which are OR-ed with the exclusive OR output thereby simplifying the network and improving the reliability.

It is therefore an object of this invention to provide a highly reliable DTPL adder-subtractor network.

It is another object to provide a DTPL network having a reduction in network length.

It is still another object to provide a DTPL adder-subtractor network which would eliminate the need for certain critical delays as was necessary in the past.

These and other advantages, features and objects of the invention will become more apparent from the following description taken in connection with the illustrative embodiment in the accompanying drawing, wherein:

DESCRIPTION OF THE DRAWINGS

FIG. 1 is a diagram of the arithmetic unit;

FIG. 2 is a diagram showing the crossover system of that used in FIG. 1;

FIG. 3 is a cross section showing a film-to-film transfer of the magnetic domains; and FIG. 4 shows a magnetic domain diode used in FIG. 1.

DESCRIPTION OF THE PREFERRED EMBODIMENT

Referring to FIG. 1, there is shown the adder-subtractor network in the form of two layers of magnetic depositions in which channels of low coercive force are surrounded by regions of high coercive force. The solid lines represent one magnetic layer designated as Film 1 and the broken magnetic layer represents the other magnetic layer known as Film 2. In certain positions the channels cross and this is called a crossover and is shown in FIG. 2. There, channel 11 of Film 1 passes over channel 13 of Film 2. The two films are insulated from each other by a suitable insulation. The crossover is designated in FIG. 1 as an "O." The width of the channels can vary in order to effect a delay for the purposes of timing. The delay channels are designated in FIG. 1 as "D."

The nucleated domain can be transferred from one film to another by a film-to-film transfer junction as shown in FIG. 3. The film-to-film transfer is the only way to move domains about in such a network as it is impossible to cross channels in the same magnetic layers without interference. When ferromagnetic film 15 is in close proximity to aluminum layer 17 the film becomes an area of high coercivity and when near glass substrate 19 the film becomes an area of low coercivity. The same is true for upper film 21 in relation to aluminum layer 23 and glass substrate 25. Magnetic domain 27 can be propagated in FIlm 15 in the area of low coercivity and the stray field from tip 17 will nucleate new domain 29 in Film 21 which can then be propagated. In FIG. 1 the film-to-film transfer is designated as "T."

Returning to FIG. 1, when the network is used as a subtractor, a domain nucleated in input A at channel 31 represents the minuend and the domains introduced in B and C represent the subtrahend and the previous Borrow. The domain is propagated in Film 1 through film-to-film transfer and then into Film 2 where it fans out to channels 33 and 35. The inputs at B and C are propagated from channels 37 and 39 of Film 1 to channels 41 and 43 via crossover channels 38 and 40 of Film 2 and are also propagated to channels 45 and 47 where the domains of channels 41 and 43 act as inhibit gates. The output of channels 41 and 43 are then propagated to channels 49 and 51 where channel 51 operates as an inhibit gate upon channel 35 of Film 2 and channel 49 is in position to be inhibited by channel 33 of Film 2. The output of either channel 49 or 35 is fed into channel 55 with point 53 acting as an OR gate and the output representing the Difference.

Channels 37 and 39 (inputs B and C) are also fed into channel 57 which after a film-to-film transfer becomes channel 59 in Film 2. Channel 61, a branch of channel 49, is adjacent to channel 59 and operates as an inhibit gate. Another branch of channel 49 becomes channel 63 in Film 2. Channels 59 and 63 combine to form channel 66 in Film 1 which is the Borrow output for the following stage.

Diodes 65 are inserted at appropriate places to control the direction of propagation. Such a diode is shown in FIG. 4*a* and schematically in FIG. 4*b*. The magnetic field is designated as "M." Normally the domain can be propagated in one direction because of the geometry of the tip and the shape of the channel will force the domain into a dead end if propagated in a direction not desired.

When the network is used as an adder, the addends are inserted in the B and C inputs with the Carry from the previous stage inserted at A and the Sum appears at channel 55. Channel 57 of Film 1 becomes channel 67 of Film 2, and channel 49 becomes inhibit gate 69 operating upon channel 67, which, after the gate, becomes channel 71 in Film 1 representing the carry output for the next stage.

The methods and apparatus for nucleation, propagation, extracting outputs, et cetera, are well known and conventional in the art.

I claim:

1. A magnetic domain arithmetic unit having first, second and third inputs comprising:

a. first and second magnetic layers, each layer defined with channels of low coercive force surrounded by regions of high coercive force;

b. a first vertical channel connected to the first input for receiving magnetic domains and being embedded in both the first and second layers with a film-to-film transfer junction interposed therebetween;

c. a first fan-out channel creating a pair of legs connected to the first channel;

d. second and third vertical channels embedded in the first magnetic layer and connected to the second and third inputs for receiving magnetic domains;

e. second and third fan-out channels creating a pair of legs, one of each pair being connected together to form a fourth vertical channel and the other of each pair forming fifth and sixth vertical channels;

f. first and second diagonal legs connected to the fifth and sixth vertical channels for receiving magnetic domains and joined together to form a fourth fan-out channel, the fourth fan-out channel forming seventh and eighth vertical channels;

g. ninth and tenth vertical channels in the second layer connected to the fifth and sixth vertical channels with a film-to-film transfer junction interposed therebetween, the ninth and tenth vertical channels being aligned in longitudinal juxtaposition with the seventh and eighth vertical channels to form domain inhibit gates;

h. an 11th vertical channel formed by a confluence of the seventh and eighth vertical channels for receiving magnetic domains;

i. a fifth fan-out channel connected to the eleventh vertical channel forming 12th and 13th vertical channels;

j. 14th and 15th vertical channels connected to the leg of the first fan-out channel for receiving magnetic domains and each aligned in longitudinal juxtaposition to the 12th and 13th channels in the first layer to form domain inhibit gates;

k. a 16th vertical channel formed by the confluence of the 13th and 14th vertical channel representing an arithmetic output terminal and having film-to-film transfer junction interposed between the 14th and 16th vertical channel;

l. a 17th vertical channel formed in the first layer representing a borrow terminal and continuing into the second layer with a film-to-film transfer junction interposed between the layers;

m. a sixth fan-out channel connected to the 17th vertical channel in the second layer creating 18th and 19th vertical channels;

n. a 20th vertical channel in the second layer connected to the fourth vertical channel of the first layer with a film-to-film transfer junction interposed therebetween;

o. a 21st vertical channel formed by a confluence of the 19th and 20th vertical channels;

p. a 22nd vertical channel of the second layer connected to the 21st channel for receiving magnetic domains and continuing into the first layer to form a Carry terminal with a film-to-film transfer junction interposed between the layers;

q. a seventh fan-out channel connected to the 13th vertical channel forming 23rd and 24th vertical channels in the first layer, the 24th vertical channel being aligned in longitudinal juxtaposition to the 22nd vertical channel of the second layer to form a domain inhibit gate and the 23rd vertical channel being continued into the second layer to join the 17th vertical channel with a film-to-film transfer junction interposed between the layers; and r. a 25th vertical channel of the first layer connected to the 11th vertical channel for receiving magnetic domains and aligned in longitudinal juxtaposition to the 19th vertical channel of the second layer to form a domain inhibit gate.

2. A magnetic domain arithmetic unit according to claim 1 where the 14th, 19th, and 20th vertical channels are delay channels.

3. A magnetic domain arithmetic unit according to claim 2 where the arithmetic unit is an adder and the second and third inputs are addends.

4. A magnetic domain arithmetic unit according to claim 2 where the arithmetic unit is a subtractor and the first input is a minuend and the second input is a subtrahend.

* * * * *